United States Patent
Tseng

(10) Patent No.: US 10,923,893 B2
(45) Date of Patent: Feb. 16, 2021

(54) TUBING STRUCTURE WITH MAGNETIC CONTROL

(71) Applicant: Wistron Corporation, New Taipei (TW)

(72) Inventor: Tien-Chung Tseng, New Taipei (TW)

(73) Assignee: Wistron Corporation, New Taipei (TW)

( * ) Notice: Subject to any disclaimer, the term of this patent is extended or adjusted under 35 U.S.C. 154(b) by 381 days.

(21) Appl. No.: 16/154,731

(22) Filed: Oct. 9, 2018

(65) Prior Publication Data

US 2019/0372322 A1 Dec. 5, 2019

(30) Foreign Application Priority Data

Jun. 4, 2018 (TW) .................................. 107119120

(51) Int. Cl.
*H02G 3/04* (2006.01)
*F16L 27/04* (2006.01)
*H01F 7/06* (2006.01)
*H01F 7/02* (2006.01)

(52) U.S. Cl.
CPC ............ *H02G 3/0475* (2013.01); *F16L 27/04* (2013.01); *H01F 7/0205* (2013.01); *H01F 7/064* (2013.01)

(58) Field of Classification Search
CPC ..... H02G 3/0475; F16L 27/04; H01F 7/0205; H01F 7/064
See application file for complete search history.

(56) References Cited

U.S. PATENT DOCUMENTS

| 2016/0195117 A1* | 7/2016 | Yeh ...................... F16M 11/041 24/303 |
| 2017/0149220 A1* | 5/2017 | Schatz ................. H02G 3/0475 |
| 2018/0278002 A1* | 9/2018 | Lai ..................... H01R 13/6205 |
| 2019/0387845 A1* | 12/2019 | Lee ........................ H01F 7/0263 |

FOREIGN PATENT DOCUMENTS

| CN | 203445573 U | 2/2014 |
| CN | 204868903 U | 12/2015 |
| CN | 206369033 U | 8/2017 |

\* cited by examiner

*Primary Examiner* — Kyle J Moody
*Assistant Examiner* — Lakaisha Jackson
(74) *Attorney, Agent, or Firm* — Winston Hsu

(57) ABSTRACT

A tubing structure includes a first unit, a second unit movably connected to the first unit, and a controller. The first unit includes a first body and at least one first magnetic component disposed inside the first body. The second unit includes a second body movably engaging with the first body and at least one second magnetic component disposed inside the second body and located at a position corresponding to the at least one first magnetic component. The controller is electrically connected to at least one of the at least one first magnetic component and the at least one second magnetic component. The controller selectively controls the at least one first magnetic component and the at least one second magnetic component to magnetically attract or repulse each other to drive the second body to move relative to the first body for inclining the second unit relative to the first unit.

20 Claims, 10 Drawing Sheets

TUBING STRUCTURE WITH MAGNETIC CONTROL

BACKGROUND OF THE INVENTION

1. Field of the Invention

The present disclosure relates to a tubing structure with magnetic control, and more particularly, to a tubing structure with a motion control capability by a magnetic mechanism between different units.

2. Description of the Prior Art

A tubing structure which is composed of a plurality of unit elements, such as a flexible tube, is usually used for covering electrical cables to prevent knotting and corrosion or used as a bracket for supporting an electronic device to allow a user to adjust the electronic device at a desired angle by bending the tubing structure according to the user's demand. However, the conventional tubing structure still has some drawbacks. For example, a retention force between the two adjacent unit elements is not strong enough, so that the tubing structure cannot be fixed at a desired angle firmly and may deform easily by an external force. Furthermore, sometimes, there is no access to the conventional tubing structure due to environmental limitations during the operation of the conventional tubing structure, and therefore, it is not possible to adjust the conventional tubing structure to a desired angle. Therefore, there is still a need to improve the conventional tubing structure.

SUMMARY OF THE INVENTION

Therefore, it is an objective of the present disclosure to provide a tubing structure with a motion control capability by a magnetic mechanism between different units for solving the aforementioned problems.

In order to achieve the aforementioned objective, the present disclosure discloses a tubing structure including a first unit, a second unit and a controller. The first unit includes a first body and at least one first magnetic component disposed inside the first body. The second unit is movably connected to the first unit. The second unit includes a second body and at least one second magnetic component. The second body movably engages with the first body. The at least one second magnetic component is disposed inside the second body and located at a position corresponding to the at least one first magnetic component. The controller is electrically connected to at least one of the at least one first magnetic component and the at least one second magnetic component. The controller selectively controls the at least one first magnetic component and the at least one second magnetic component to magnetically attract or repulse each other to drive the second body to move relative to the first body for inclining the second unit relative to the first unit.

According to an embodiment of the present disclosure, the first body includes a ball joint. An annular recess is formed on the second body, and the ball joint movably engages with the annular recess.

According to an embodiment of the present disclosure, a first passage is formed inside the first body. A second passage is formed inside the second body, and the first passage is at least partially communicated with the second passage when the first body and the second body engage with each other by the ball joint and the annular recess.

According to an embodiment of the present disclosure, the at least one first magnetic component and the at least one second magnetic component are electromagnetic components electrically connected to the controller, and the controller controls magnetism of the at least one first magnetic component and magnetism of the at least one second magnetic component.

According to an embodiment of the present disclosure, one of the at least one first magnetic component and the at least one second magnetic component is an electromagnetic component electrically connected to the controller. The controller controls magnetism of the electromagnetic component, and the other one of the at least one first magnetic component and the at least one second magnetic component is a permanent magnetic component or a magnetic conductive component.

According to an embodiment of the present disclosure, the first unit includes a plurality of first magnetic components disposed inside the first body at intervals. The second unit includes a plurality of second magnetic components disposed inside the second body at intervals and located at positions corresponding to the plurality of first magnetic components. The plurality of first magnetic components and the plurality of second magnetic components are electrically connected to the controller, and the controller selectively controls at least one of the plurality of first magnetic components and at least one of the plurality of second magnetic components to magnetically attract or repulse each other to drive the second body to move relative to the first body for inclining the second unit relative to the first unit.

According to an embodiment of the present disclosure, the plurality of first magnetic components are circularly disposed inside the first body at equal intervals, and the plurality of second magnetic components are circularly disposed inside the second body at equal intervals.

According to an embodiment of the present disclosure, the first body includes a first lower portion, a first upper portion and a first protruding and retracting assembly. The first upper portion is protrusibly and retractably installed on the first lower portion. The first protruding and retracting assembly is configured to protrude or retract the first upper portion relative to the first lower portion.

According to an embodiment of the present disclosure, the first protruding and retracting assembly includes a first upper magnetic component and a first lower magnetic component. The first upper magnetic component is disposed on the first upper portion. The first lower magnetic component is disposed on the first lower portion and located at a position corresponding to the first upper magnetic component. The controller is connected to at least one of the first upper magnetic component and the first lower magnetic component, and the controller selectively controls the first upper magnetic component and the first lower magnetic component to magnetically attract or repulse each other to retract or protrude the first upper portion relative to the first lower portion.

According to an embodiment of the present disclosure, the first upper magnetic component and the first lower magnetic component are electromagnetic components electrically connected to the controller, and the controller controls magnetism of the first upper magnetic component and magnetism of the first lower magnetic component.

According to an embodiment of the present disclosure, one of the first upper magnetic component and the first lower magnetic component is an electromagnetic component electrically connected to the controller. The controller controls magnetism of the electromagnetic component, and the other one of the first upper magnetic component and the first lower magnetic component is a permanent magnetic component or a magnetic conductive component.

According to an embodiment of the present disclosure, the second body includes a second lower portion, a second upper portion and a second protruding and retracting assembly. The second upper portion is protrusibly and retractably installed on the second lower portion. The second protruding and retracting assembly is configured to protrude or retract the second upper portion relative to the second lower portion.

According to an embodiment of the present disclosure, the second protruding and retracting assembly includes a second upper magnetic component and a second lower magnetic component. The second upper magnetic component is disposed on the second upper portion. The second lower magnetic component is disposed on the second lower portion and located at a position corresponding to the second upper magnetic component. The controller is connected to at least one of the second upper magnetic component and the second lower magnetic component. The controller selectively controls the second upper magnetic component and the second lower magnetic component to magnetically attract or repulse each other to retract or protrude the second upper portion relative to the second lower portion.

According to an embodiment of the present disclosure, the second upper magnetic component and the second lower magnetic component are electromagnetic components electrically connected to the controller, and the controller controls magnetism of the second upper magnetic component and magnetism of the second lower magnetic component.

According to an embodiment of the present disclosure, one of the second upper magnetic component and the second lower magnetic component is an electromagnetic component electrically connected to the controller. The controller controls magnetism of the electromagnetic component, and the other one of the second upper magnetic component and the second lower magnetic component is a permanent magnetic component or a magnetic conductive component.

In order to achieve the aforementioned objective, the present disclosure further discloses a tubing structure including a first unit, a second unit and a controller. The first unit includes a first body, and the first body includes a first lower portion, a first upper portion and a first protruding and retracting assembly. The first upper portion is protrusibly and retractably installed on the first lower portion. The first protruding and retracting assembly is configured to protrude or retract the first upper portion relative to the first lower portion, and the first protruding and retracting assembly includes a first upper magnetic component and a first lower magnetic component. The first upper magnetic component is disposed on the first upper portion. The first lower magnetic component is disposed on the first lower portion and located at a position corresponding to the first upper magnetic component. The second unit is movably connected to the first unit. The controller is electrically connected to at least one of the first upper magnetic component and the first lower magnetic component. The controller selectively controls the first upper magnetic component and the first lower magnetic component to attract or repulse each other to protrude or retract the first upper portion relative to the first lower portion.

According to an embodiment of the present disclosure, the second unit includes a second body, and the second body includes a second lower portion, a second upper portion and a second protruding and retracting assembly. The second upper portion is protrusibly and retractably installed on the second lower portion. The second protruding and retracting assembly is configured to protrude or retract the second upper portion relative to the second lower portion, and the second protruding and retracting assembly includes a second upper magnetic component and a second lower magnetic component. The second upper magnetic component is disposed on the second upper portion. The second lower magnetic component is disposed on the second lower portion and located at a position corresponding to the second upper magnetic component. The controller is connected to at least one of the second upper magnetic component and the second lower magnetic component, and the controller selectively controls the second upper magnetic component and the second lower magnetic component to magnetically attract or repulse each other to retract or protrude the second upper portion relative to the second lower portion.

According to an embodiment of the present disclosure, the first unit further includes at least one first magnetic component disposed on the first upper portion. The second unit further includes at least one second magnetic component disposed on the second upper portion and located at a position corresponding to the at least one first magnetic component. The controller is electrically connected to at least one of the at least one first magnetic component and the at least one second magnetic component, and the controller selectively controls the at least one first magnetic component and the at least one second magnetic component to magnetically attract or repulse each other to drive the first body to move relative to the first body for inclining the second unit relative to the first unit.

According to an embodiment of the present disclosure, the first body further includes a ball joint disposed on the first upper portion. An annular recess is formed on the second lower portion of the second body. The ball joint movably engages with the annular recess. A first passage is formed inside the first body. A second passage is formed inside the second body, and the first passage is at least partially communicated with the second passage when the first body and the second body movably engages with each other by the ball joint and the annular recess.

According to an embodiment of the present disclosure, the first unit further includes a plurality of first magnetic components disposed on the first upper portion at intervals. The second unit further includes a plurality of second magnetic components disposed on the second upper portion at intervals and located at positions corresponding to the plurality of first magnetic components. The plurality of first magnetic components and the plurality of second magnetic components are electrically connected to the controller, and the controller selectively controls at least one of the plurality of first magnetic components and at least one of the plurality of second magnetic components to magnetically attract or repulse each other to drive the second body to move relative to the first body for inclining the second unit relative to the first unit.

In summary, the present disclosure utilizes the controller to selectively control the first magnetic component and the second magnetic component to magnetically attract or repulse each other to drive the second body to move relative to the first body for inclining the second unit relative to the first unit. Therefore, even if there is no access for adjusting an inclined angle of the second unit relative to the first unit manually due to environmental limitations, the inclined angle of the second unit relative to the first unit still can be adjusted by the controller to achieve a purpose of adjusting a bending angle of the tubing structure, which brings convenience in use. Furthermore, the inclined angle of the second unit relative to the first unit can be firmly fixed by the magnetic mechanism between the first magnetic component and the second magnetic component, which can secure the inclined angle of the second unit relative to the first unit when the tubing structure is collided. Besides, the present disclosure further utilizes the controller to selectively control the first upper magnetic component and the first lower magnetic component to magnetically attract or repulse each other to drive the first upper portion to protrude or retract relative to the first lower portion and further control the second upper magnetic component and the second lower magnetic component to magnetically attract or repulse each other to drive the second upper portion to protrude or retract relative to the second lower portion to achieve a purpose of adjusting an overall length of the tubing structure. Therefore, the tubing structure of the present disclosure can accomplish a mission which a conventional robot arm cannot accomplish due to environmental limitations. Moreover, a distal end of the tubing structure can be equipped with cameras, light sources or forceps to execute a corresponding mission, such as being used as medical auxiliary illumination, a fixing device for a jig or a fixture, or an internal cavity detector. Besides, the first passage is at least partially communicated with the second passage when the first body and the second body engage with each other by the ball joint and the annular recess, which allows other components, such as electrical cable, or other devices, such as image capturing devices or fixing devices to pass through the tubing structure. Therefore, the tubing structure can be applied to different fields with different components or devices.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
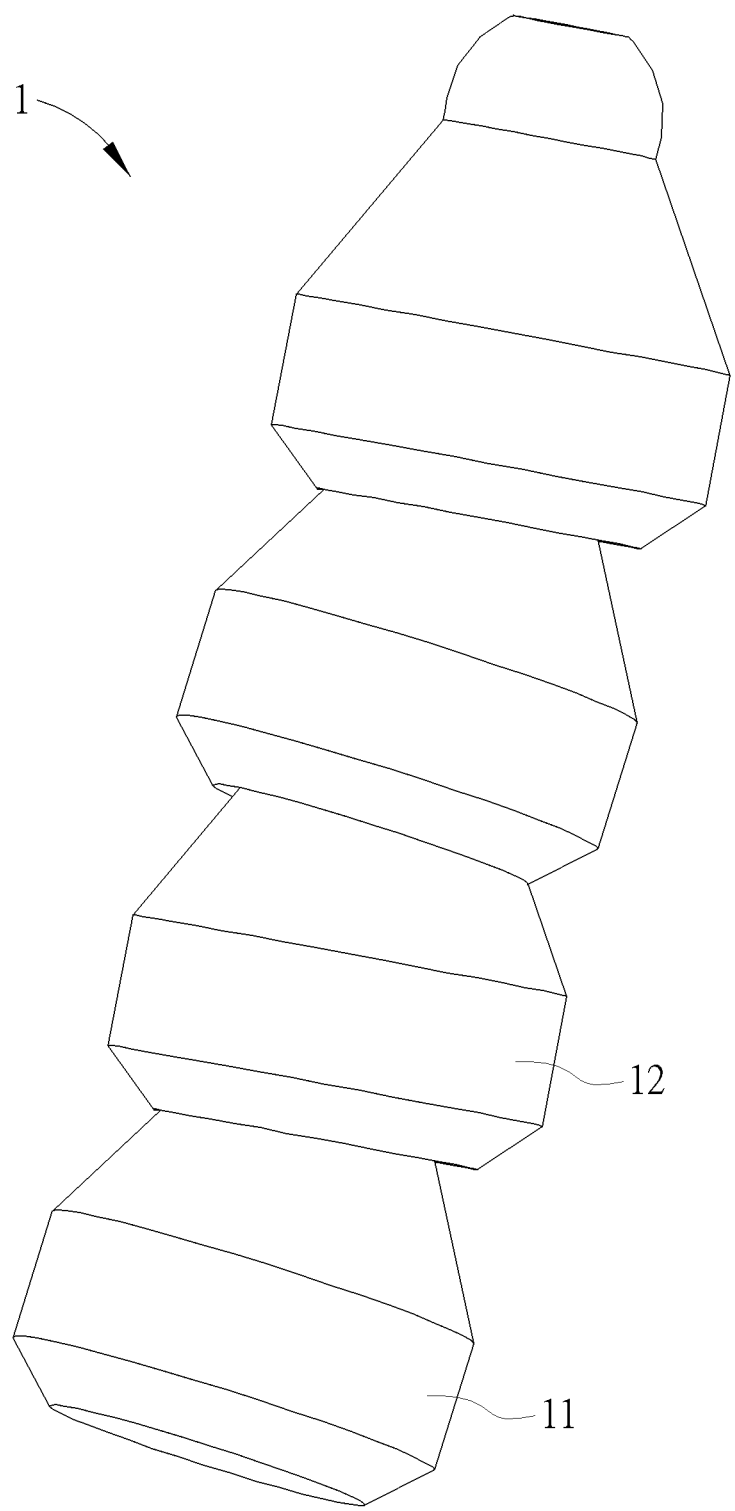
FIG. 1 is a schematic diagram of a tubing structure according to a first embodiment of the present disclosure.

Refer to FIG. 1. FIG. 1 is a schematic diagram of a tubing structure 1 according to a first embodiment of the present disclosure. As shown in FIG. 1, the tubing structure 1 can include a plurality of units assembled in series and at least including a first unit 11 and a second unit 12. The number of the units of the tubing structure 1 is not limited to this embodiment. It depends on practical demands. The units have similar structure. The two adjacent units are movably connected to each other. An inclined angle of the two adjacent units can be adjusted for achieve a purpose of adjusting a bending angle of the tubing structure 1. In order to illustrate technical specifications and structural features as well as achieved purposes and effects of the present disclosure more specifically, detailed description of the first unit 11 and the second unit 12 is provided as follows.

Figure 2:
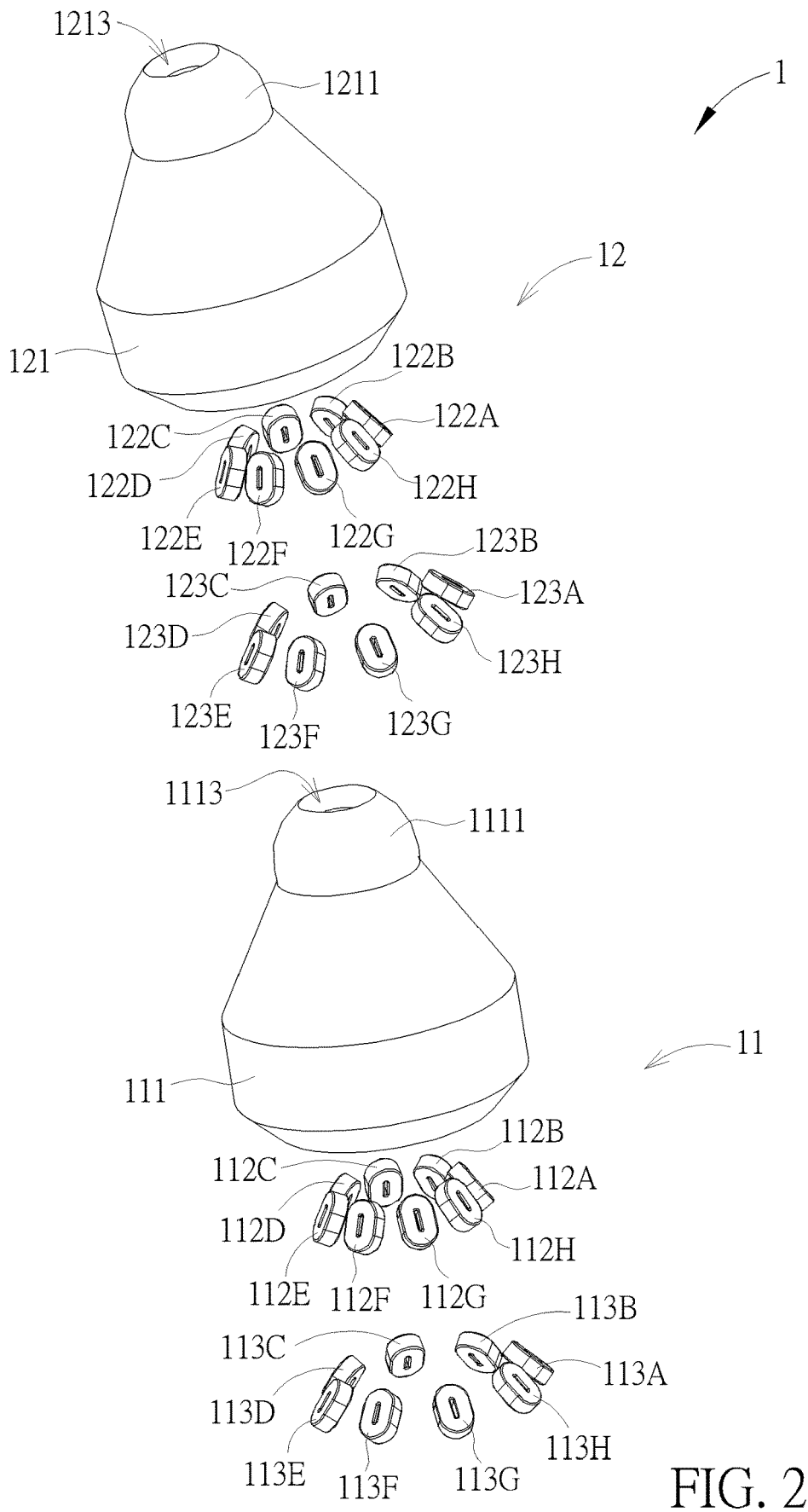
FIG. 2 and FIG. 3 are exploded diagrams of the tubing structure at different views according to the first embodiment of the present disclosure.
Figure 3:
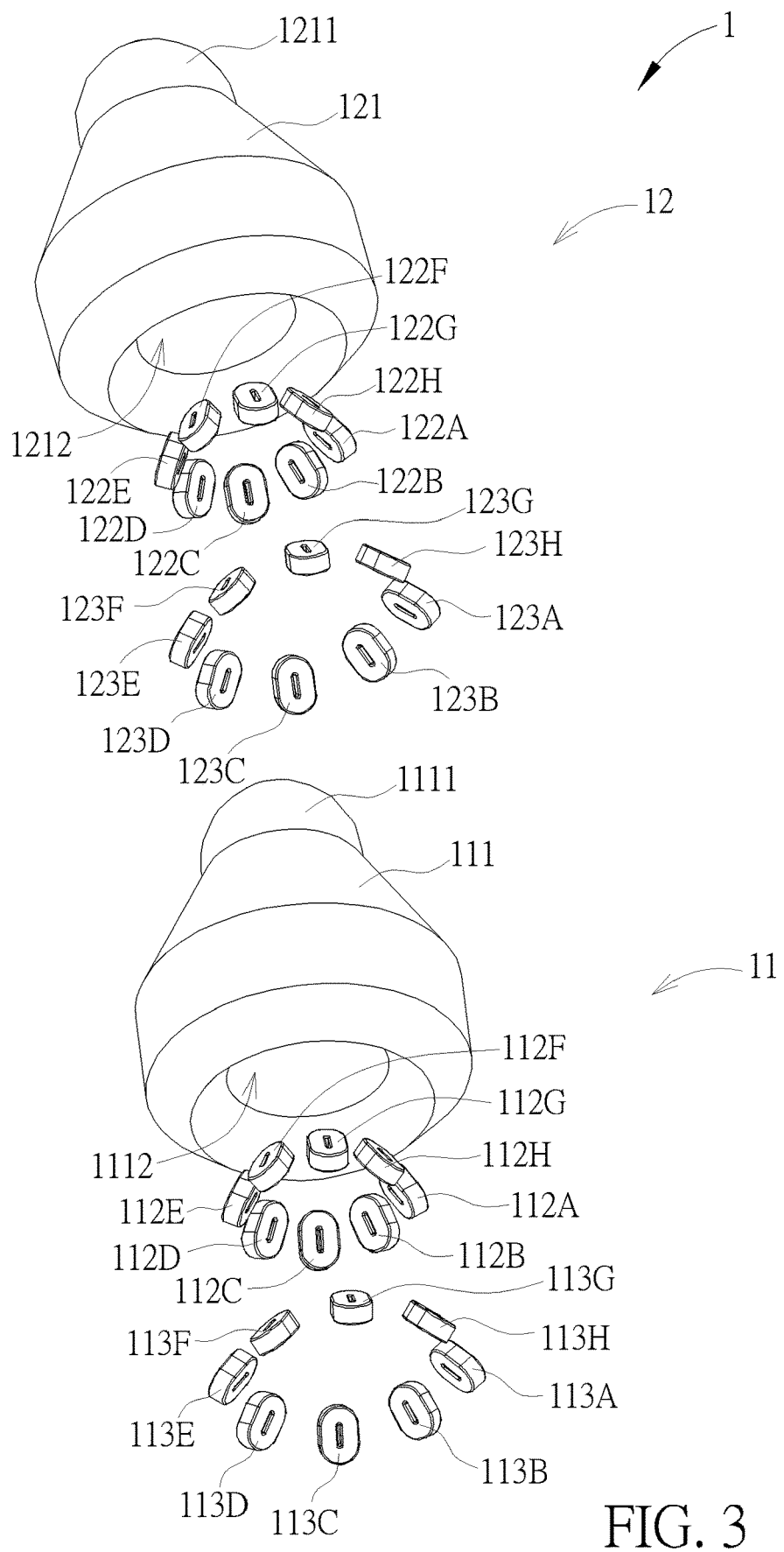

Refer to FIG. 2 and FIG. 3. FIG. 2 and FIG. 3 are exploded diagrams of the tubing structure 1 at different views according to the first embodiment of the present disclosure. As shown in FIG. 2 and FIG. 3, the first unit 11 includes a first body 111. The second unit 12 includes a second body 121. The first body 111 includes a ball joint 1111, and the second body 112 includes a ball joint 1211. An annular recess 1112 is formed on the first body 111, and an annular recess 1212 is formed on the second body 121. The ball joint 1111 of the first body 111 movably engages with the annular recess 1212 on the second body 121, so that the second body 121 can move relative to the first body 111 by cooperation of the ball joint 1111 and the annular recess 1212. Furthermore, a first passage 1113 is formed inside the first body 111. The first passage 1113 penetrates through the first body 111 and is communicated with the ball joint 1111 and the annular recess 1112. A second passage 1213 is formed inside the second body 121. The second passage 1213 penetrates through the second body 121 and is communicated with the ball joint 1211 and the annular recess 1212. The first passage 1113 and the second passage 1213 are at least partially communicated with each other when the first body 111 and the second body 121 engage with each other by the ball joint 1111 and the annular recess 1212, which allows other components, such as electrical cables, or other devices, such as image capturing devices or fixing devices, to pass through the tubing structure 1 of the present disclosure. Therefore, the tubing structure 1 can be applied to different fields with different components or different devices. For example, the first passage 1113 and the second passage 1213 can form a channel for allowing an endoscope to pass through the tubing structure 1 for sampling in the medical industry.

Figure 4:
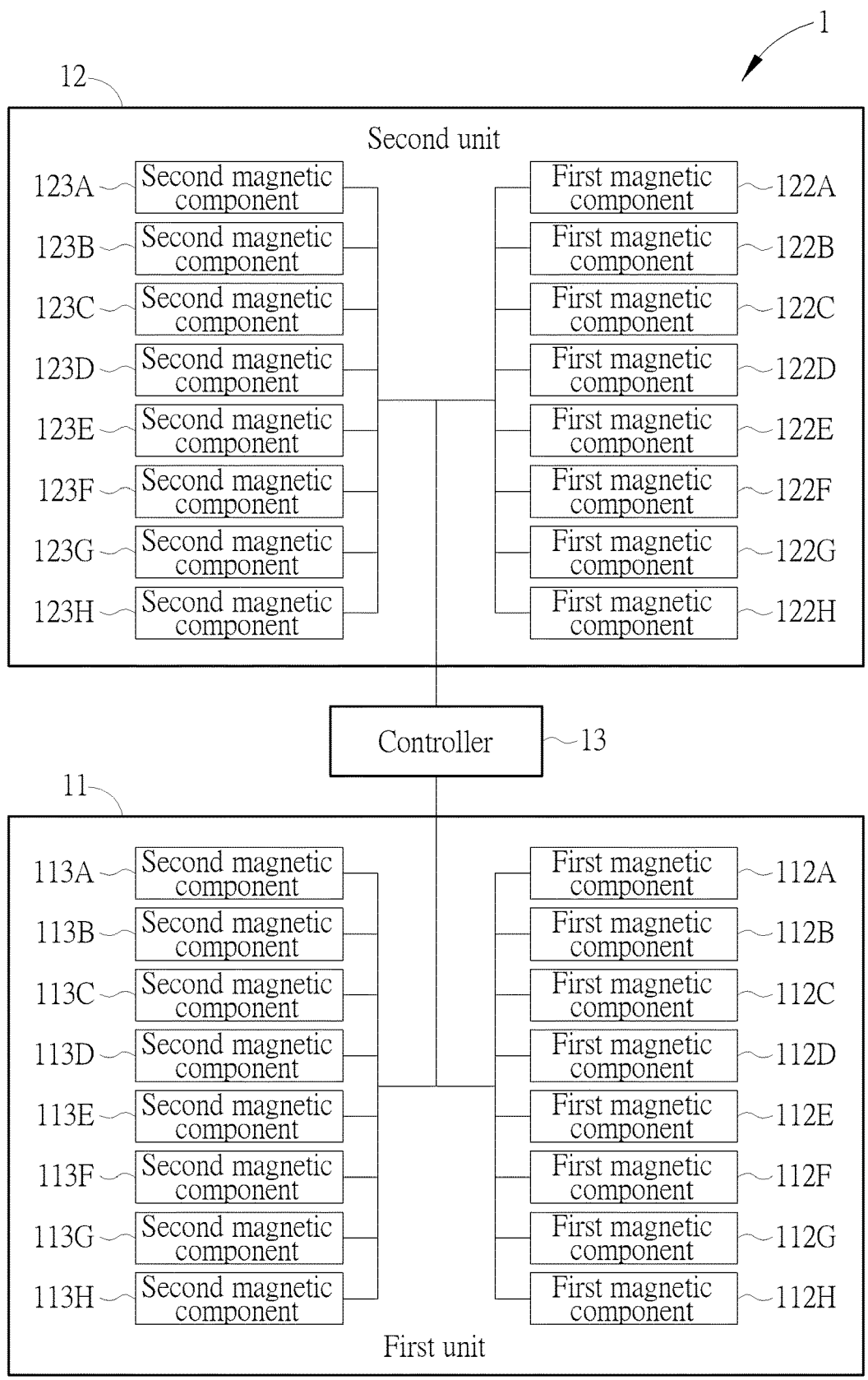
FIG. 4 is a functional block diagram of the tubing structure according to the first embodiment of the present disclosure.
Figure 5:
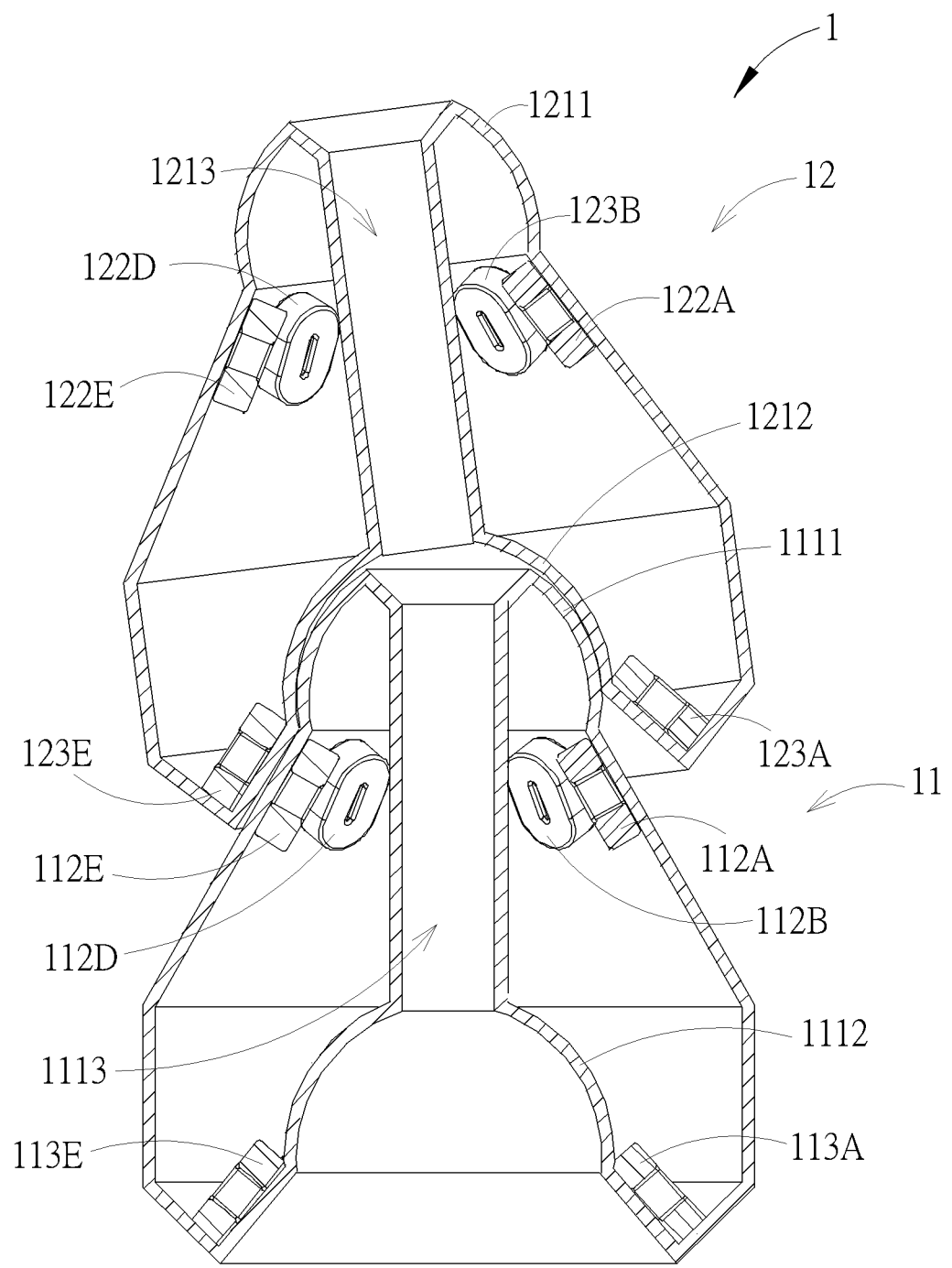
FIG. 5 is an internal structural diagram of the tubing structure according to the first embodiment of the present disclosure.

Refer to FIG. 2 to FIG. 5. FIG. 4 is a functional block diagram of the tubing structure 1 according to the first embodiment of the present disclosure. FIG. 5 is an internal structural diagram of the tubing structure 1 according to the first embodiment of the present disclosure. As shown in FIG. 2 to FIG. 5, the tubing structure 1 further includes a controller 13, which can be a processing chip. The first unit 11 further includes eight first magnetic components 112A~112H and eight second magnetic components 113A~113H. The eight first magnetic components 112A~112H can be circularly disposed inside the first body 111 at equal intervals and adjacent to the ball joint 1111. The eight second magnetic components 113A~113H can be circularly disposed inside the first body 111 at equal intervals and adjacent to the annular recess 1112. Similarly, the second unit 12 further includes eight first magnetic components 122A~122H and eight second magnetic components 123A~123H. The eight first magnetic components 122A~122H can be circularly disposed inside the second body 121 at equal intervals and adjacent to the ball joint 1211. The eight second magnetic components 123A~123H can be circularly disposed inside the second body 121 at equal intervals and adjacent to the annular recess 1212. In other words, the eight second magnetic components 123A~123H of the second unit 12 are located in positions corresponding to the eight first magnetic components 112A~112H when the first unit 11 and the second unit 12 movably engage with each other. The controller 13 is electrically connected to the eight first magnetic components 112A~112H and the eight second magnetic components 113A~113H of the first unit 11 and also electrically connected to the eight first magnetic components 122A~122H and the eight second magnetic components 123A~123H of the second unit 12 for selectively controlling at least one of the eight first magnetic components 112A~112H of the first unit 11 and at least one of the eight second magnetic components 123A~123H of the second unit 12 to magnetically attract or repulse each other to drive the second body 121 to move relative to the first body 111 by cooperation of the ball joint 1111 and the annular recess 121 for inclining the second unit 12 relative to the first unit 11.

However, the numbers and the configurations of the first magnetic components and the second magnetic components are not limited to those illustrated in the figures. It depends on practical demands. For example, in another embodiment, the first unit can include one first magnetic component and one second magnetic component only, and the second unit can include one first magnetic component and one second magnetic component only. Alternatively, in another embodiment, the first unit also can include a plurality of first magnetic components circularly disposed at equal or unequal intervals and a plurality of second magnetic components circularly disposed at equal or unequal intervals, and the second unit can include a plurality of first magnetic components circularly disposed at equal or unequal intervals and a plurality of second magnetic components circularly disposed at equal or unequal intervals. Furthermore, the numbers of the first magnetic components and the second magnetic components of the second unit are not required to be equal to the numbers of the first magnetic components and the second magnetic components of the first unit.

Besides, understandably, the tubing structure 1 also can include a resilient recovering component, which is not shown in the figures, connected to the first body 111 and the second body 121. The resilient recovering component can be a tensional spring or a torsional spring to bias the second body 121 to recover relative to the first body 111. Therefore, the deformed resilient recovering component can drive the second body 121 to recover relative to the first body 111 to align the second unit 12 with the first unit 11 when there is no magnetic attraction or repulsion between the first magnetic components 112A~112H of the first unit 11 and the second magnetic components 123A~123H of the second unit 12. However, it is not limited thereto. In another embodiment, the second body 121 also can be recovered relative to the first body 111 by a magnetic recovering mechanism.

Figure 6:
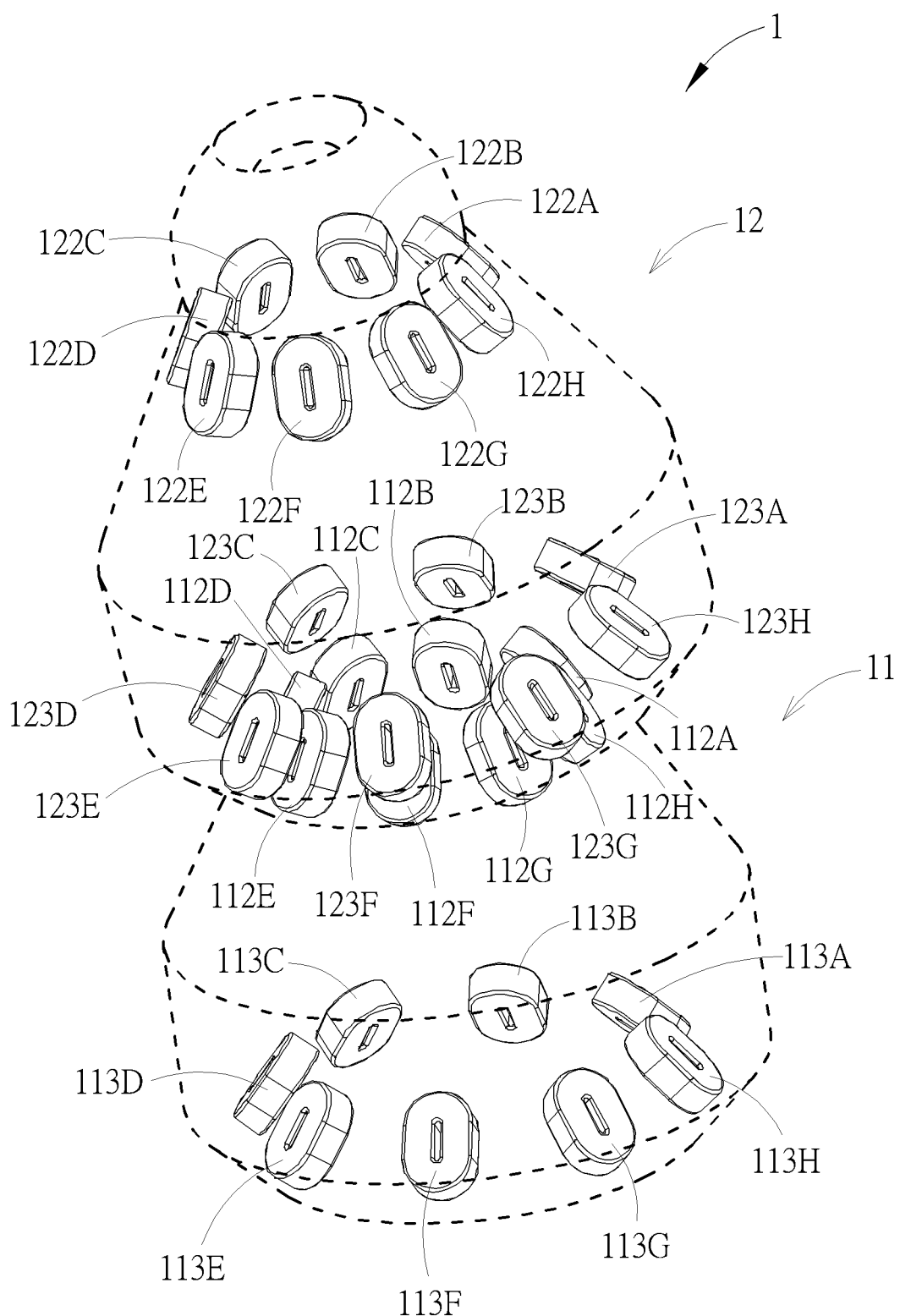
FIG. 6 is a diagram of the tubing structure in a first state according to the first embodiment of the present disclosure.

Refer to FIG. 5 and FIG. 6. FIG. 6 is a diagram of the tubing structure 1 in a first state according to the first embodiment of the present disclosure. For example, when it is desired to adjust the tubing structure 1 to the first state as shown in FIG. 6, the user can input commands for the controller 13 to control magnetism of the eight first magnetic components 112A~112H and magnetism of the eight second magnetic components 123A~123H, so that a relation of the magnetism of the eight first magnetic components 112A~112H and the magnetism of the eight second magnetic components 123A~123H can be shown in following Table 1. At this moment, the first magnetic components 112A, 112B, 112H and the corresponding second magnetic components 123A, 123B, 123H magnetically repulse each other, i.e., the adjacent sides of the first magnetic components 112A, 112B, 112H and the second magnetic components 123A, 123B, 123H have the same magnetic pole. Furthermore, the first magnetic components 112D, 112E, 112F and the corresponding second magnetic components 123D, 123E, 123F magnetically attract each other, i.e., the adjacent sides of the first magnetic components 112D, 112E, 112F and the second magnetic components 123D, 123E, 123F have the opposite magnetic poles. Besides, there is no magnetic attraction or repulsion between the first magnetic components 112C, 112G and the corresponding second magnetic components 123C, 123G. For example, the first magnetic components 112C, 112G and the corresponding second magnetic components 123C, 123G can be not electrified, so as not to have any magnetic pole. Therefore, the second body 121 can be driven to be move relative to the first body 111 by a magnetic resultant force of the aforementioned magnetic mechanism, so that the second unit 12 can be inclined relative to the first unit 11 toward a direction of the magnetic resultant force of the aforementioned magnetic mechanism, i.e., a magnetic attracting direction of the first magnetic components 112D, 112E, 112F and the corresponding second magnetic components 123D, 123E, 123F. In such a way, the tubing structure 1 can utilize the aforementioned magnetic mechanism to achieve the purpose of adjusting the bending angle of the tubing structure 1.

TABLE 1

| First magnetic component | Second magnetic component | Magnetism relation |
| --- | --- | --- |
| First magnetic component 112A | Second magnetic component 123A | Repulsion |
| First magnetic component 112B | Second magnetic component 123B | Repulsion |
| First magnetic component 112C | Second magnetic component 123C | N/A |
| First magnetic component 112D | Second magnetic component 123D | Attraction |
| First magnetic component 112E | Second magnetic component 123E | Attraction |
| First magnetic component 112F | Second magnetic component 123F | Attraction |
| First magnetic component 112G | Second magnetic component 123G | N/A |
| First magnetic component 112H | Second magnetic component 123H | Repulsion |

However, the relation of the magnetism of the first magnetic components 112A~112H and the magnetism of the second magnetic component 123A~123H is not limited to this embodiment. For example, in another embodiment, the relation of the magnetism of the eight first magnetic components 112A~112H and the magnetism of the eight second magnetic components 123A~123H also can be shown in following Table 2. In other words, when it is desired to adjust the bending angle of the tubing structure 1, the user can input commands for the controller 13 to control the magnetism of the first magnetic components 112A~112H and the magnetism of the second magnetic component 123A~123H in different manners to adjust the direction of the magnetic resultant force of the eight first magnetic components 112A~112H and the eight second magnetic components 123A~123H to magnetically drive the second body 121 to move relative to the first body 111 for inclining the second body 12 relative to the first unit toward the direction of the magnetic resultant force. The difference between this embodiment and the first embodiment is that there is magnetic repulsion between the first magnetic component 112A and the second magnetic component 123A and magnetic attraction between the first magnetic component 112E and the second magnetic component 123E. However, the magnetic resultant force of the aforementioned magnetic mechanism still can drive the second unit 12 to be inclined relative to the first unit 11. That is, any mechanism which can magnetically drive one of the units to move relative to another one of the units is included within the scope of the present disclosure. It depends on practical demands.

TABLE 2

| First magnetic component | Second magnetic component | Magnetism relation |
| --- | --- | --- |
| First magnetic component 112A | Second magnetic component 123A | Repulsion |
| First magnetic component 112B | Second magnetic component 123B | N/A |
| First magnetic component 112C | Second magnetic component 123C | N/A |
| First magnetic component 112D | Second magnetic component 123D | N/A |
| First magnetic component 112E | Second magnetic component 123E | Attraction |
| First magnetic component 112F | Second magnetic component 123F | N/A |
| First magnetic component 112G | Second magnetic component 123G | N/A |
| First magnetic component 112H | Second magnetic component 123H | N/A |

It should be noticed that, in this embodiment, each of the first magnetic components 112A~112H and the second magnetic components 123A~123H can preferably be an electromagnetic component electrically connected to the controller 13. However, it is not limited thereto. Any component which can magnetically drive the second body to move relative to the first body is included within the scope of the present disclosure. For example, in another embodiment, each of the first magnetic components 112A~112H can be an electromagnetic component electrically connected to the controller 13, and each of the second magnetic components 123A~123H can be a permanent magnetic component or a magnetic conductive component. The controller 13 can control the magnetism of the first magnetic components 112A~112H to make the first magnetic components 112A~112H and the second magnetic components 123A~123H magnetically attract or repulse each other for inclining the second unit 12 relative to the first unit 11 to achieve the purpose of adjusting the bending angle of the tubing structure 1. Alternatively, in another embodiment, each of the second magnetic components 123A~123H can be an electromagnetic component electrically connected to the controller 13, and each of the first magnetic components 112A~112H can be a permanent magnetic component or a magnetic conductive component. The controller 13 can control the magnetism of the second magnetic components 123A~123H to make the first magnetic components 112A~112H and the second magnetic components 123A~123H magnetically attract or repulse each other for inclining the second unit 12 relative to the first unit 11 to achieve the purpose of adjusting the bending angle of the tubing structure 1. Furthermore, understandably, the structure and the operational principle of the other units of the tubing structure 1 are similar to the aforementioned ones. Detailed description is omitted herein for simplicity.

Figure 7:
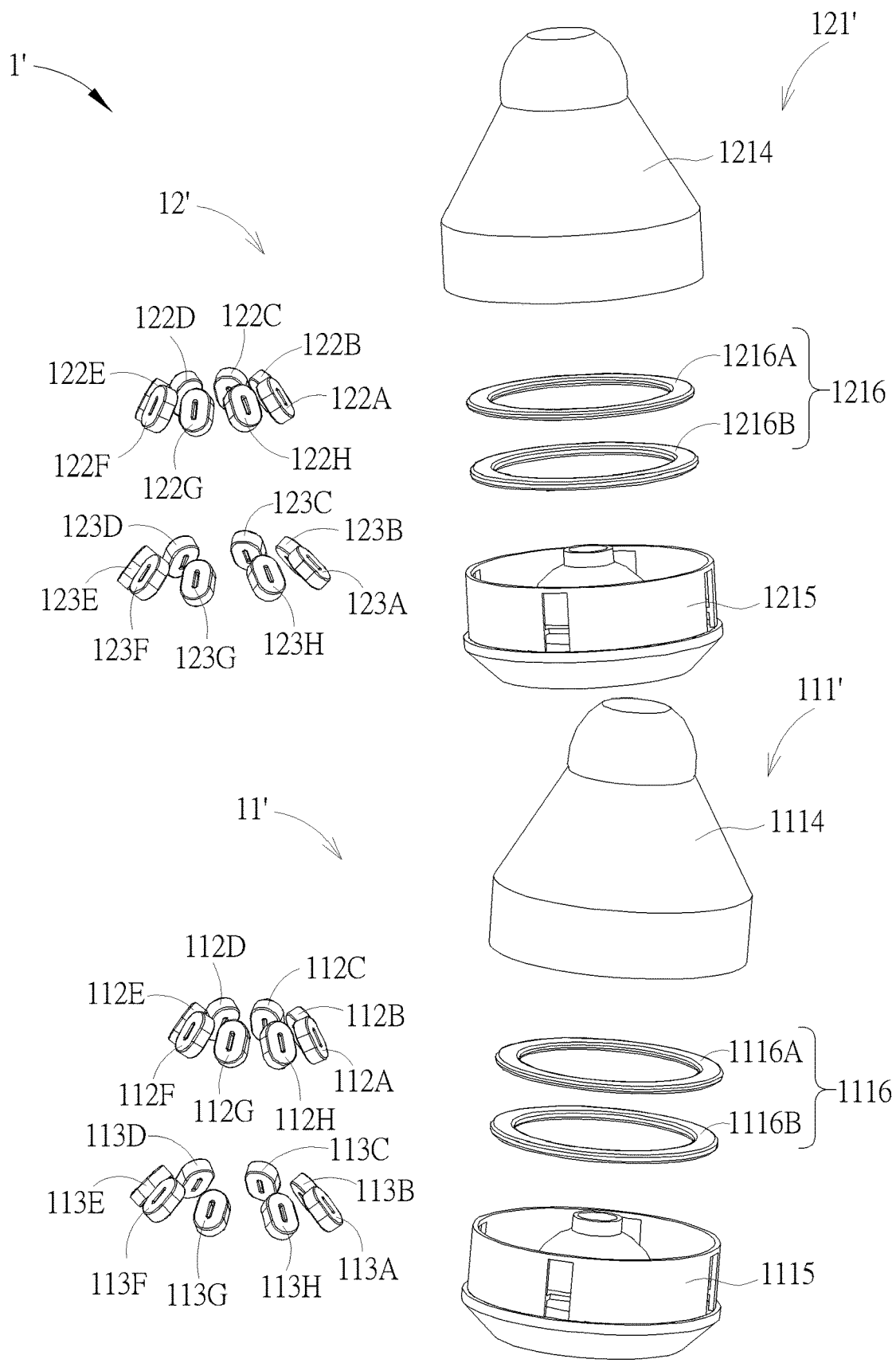
FIG. 7 and FIG. 8 are exploded diagrams of a tubing structure at different views according to a second embodiment of the present disclosure.
Figure 8:
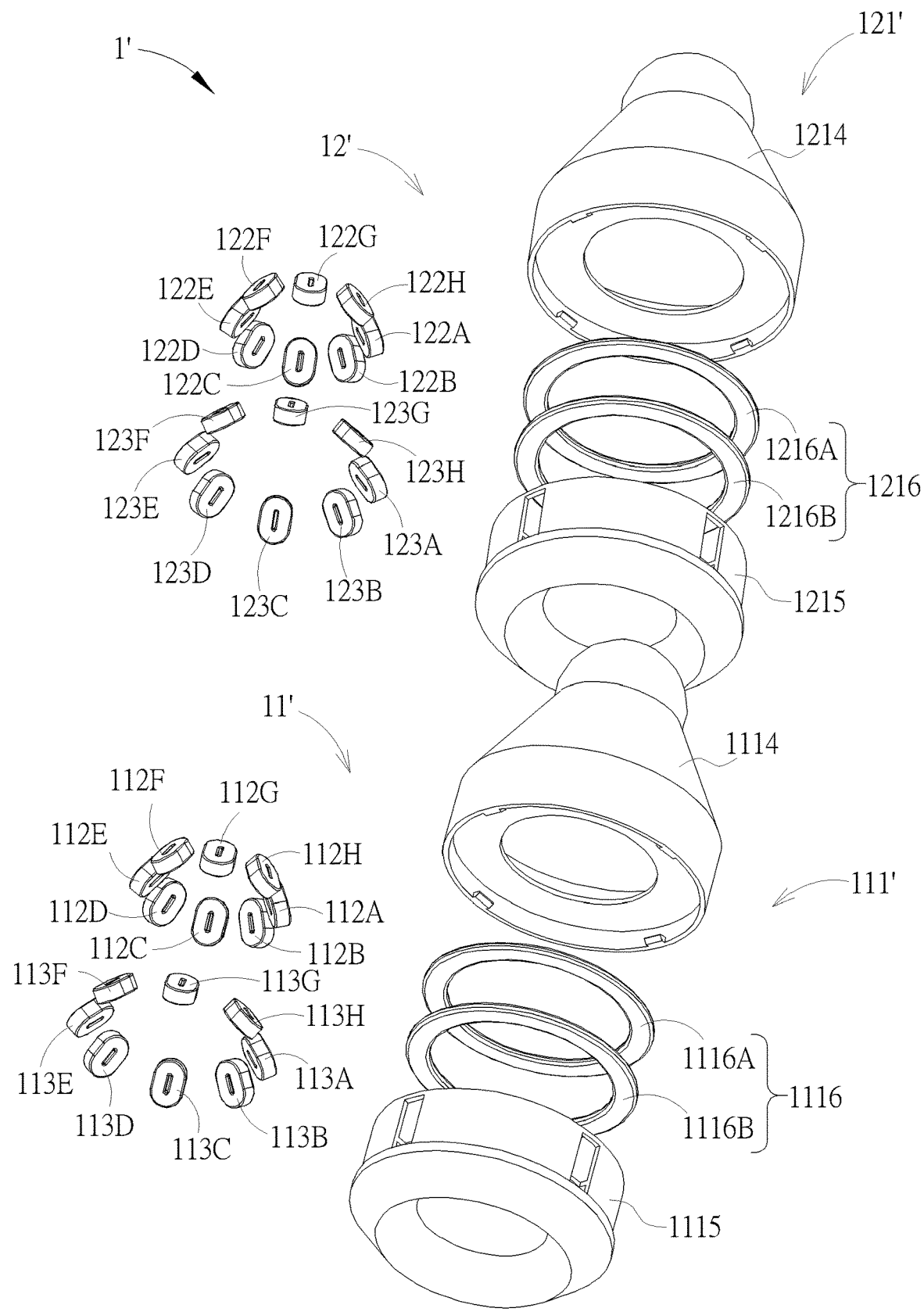
Figure 9:
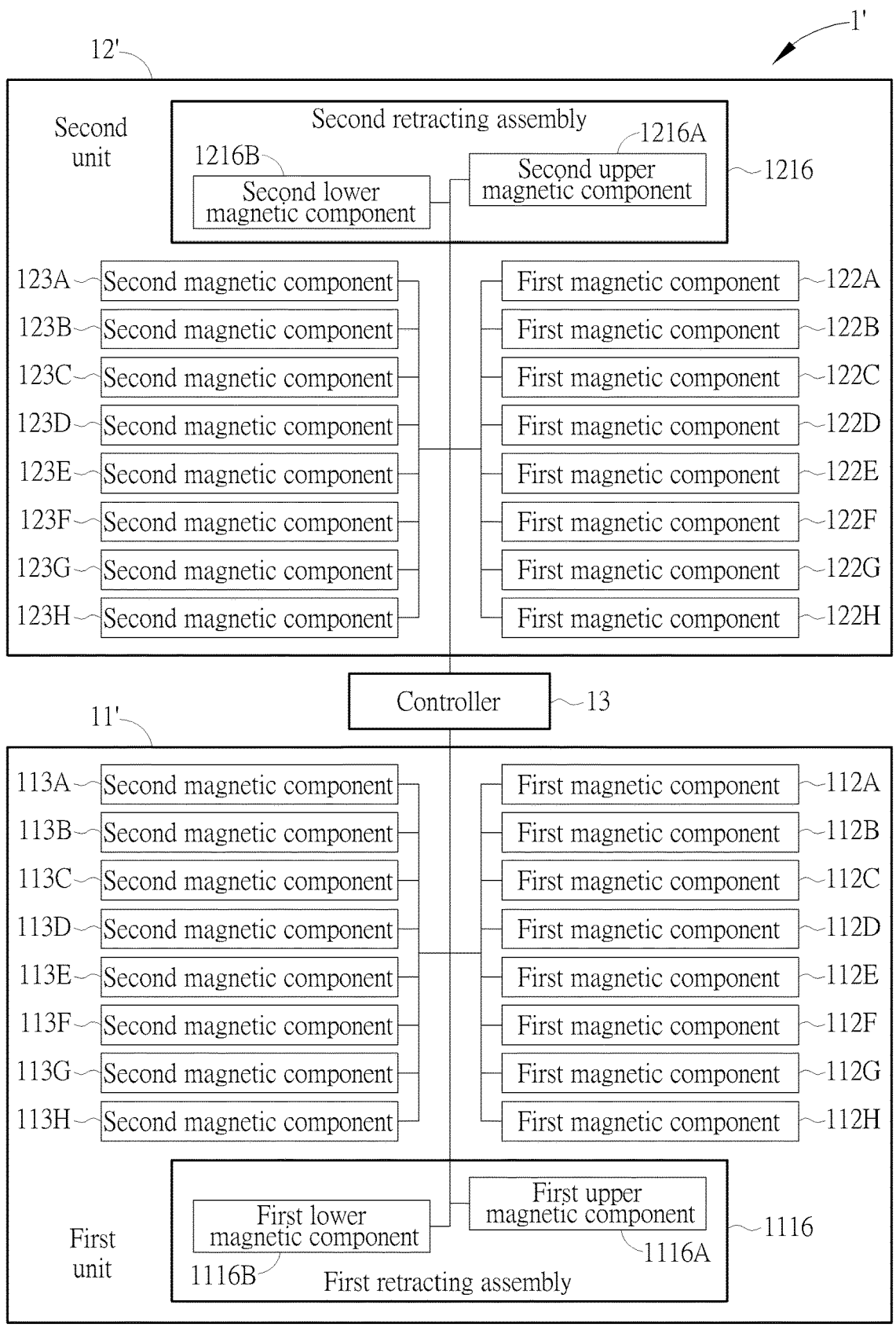
FIG. 9 is a functional block diagram of the tubing structure according to the second embodiment of the present disclosure.

Please further refer to FIG. 7 to FIG. 9. FIG. 7 and FIG. 8 are exploded diagrams of a tubing structure 1' at different views according to a second embodiment of the present disclosure. FIG. 9 is a functional block diagram of the tubing structure 1' according to the second embodiment of the present disclosure. As shown in FIG. 7 to FIG. 9, different from the tubing structure 1 of the first embodiment, a first body 111' of a first unit 11' of the tubing structure 1' of this embodiment further includes a first upper portion 1114, a first lower portion 1115 and a first protruding and retracting assembly 1116. The first upper portion 1114 is protrusibly and retractably installed on the first lower portion 1115. The first protruding and retracting assembly 1116 is configured to protrude or retract the first upper portion 1114 relative to the first lower portion 1115. Similarly, a second body 121' of a second unit 12' further includes a second upper portion 1214, a second lower portion 1215 and a second protruding and retracting assembly 1216. The second upper portion 1214 is protrusibly and retractably installed on the second lower portion 1215. The second protruding and retracting assembly 1216 is configured to protrude or retract the second upper portion 1214 relative to the second lower portion 1215. In other words, in this embodiment, it not only can adjust the bending angle of the tubing structure 1' by inclining the second unit 12' relative to the first unit 11', but also can adjust an overall length of the tubing structure 1' by protruding or retracting the first upper portion 1114 and the second upper portion 1214 relative to the first lower portion 1115 and the second lower portion 1215 respectively.

Specifically, the first protruding and retracting assembly 1116 includes a first upper magnetic component 1116A and a first lower magnetic component 1116B. The first upper magnetic component 1116A is disposed on the first upper portion 1114. The first lower magnetic component 1116B is disposed on the first lower portion 1115 and located at a position corresponding to the first upper magnetic component 1116A. The controller 13 is further electrically connected to the first upper magnetic component 1116A and the first lower magnetic component 1116B for selectively controlling the first upper magnetic component 1116A and the first lower magnetic component 1116B to magnetically attract or repulse each other to drive the first upper portion 1114 to protrude or retract relative to the first lower portion 1115. Similarly, the second protruding and retracting assembly 1216 includes a second upper magnetic component 1216A and a second lower magnetic component 1216B. The second upper magnetic component 1216A is disposed on the second upper portion 1214. The second lower magnetic component 1216B is disposed on the second lower portion 1215 and located at a position corresponding to the second upper magnetic component 1216A. The controller 13 is further electrically connected to the second upper magnetic component 1216A and the second lower magnetic component 1216B for selectively controlling the second upper magnetic component 1216A and the second lower magnetic component 1216B to magnetically attract or repulse each other to drive the second upper portion 1214 to protrude or retract relative to the second lower portion 1215. Furthermore, understandably, the tubing structure 1' also can further include two resilient recovering components, which are not shown in the figures, respectively connected to the first upper portion 1114 and the first lower portion 1115 and to the second upper portion 1214 and the second lower portion 1215. The two resilient recovering components can be tensional springs or torsional springs. The two resilient recovering components can bias the first upper portion 1114 and the second upper portion 1214 to recover relative to the first lower portion 1115 and the second lower portion 1215 respectively. Therefore, the first upper portion 1114 and the second upper portion 1214 can be driven to recover relative to the first lower portion 1115 and the second lower portion 1215 respectively when there is no magnetic attraction or repulsion between the first upper magnetic component 1116A and the first lower magnetic component 1116B and between the second upper magnetic component 1216A and the second lower magnetic component 1216B.

Figure 10:
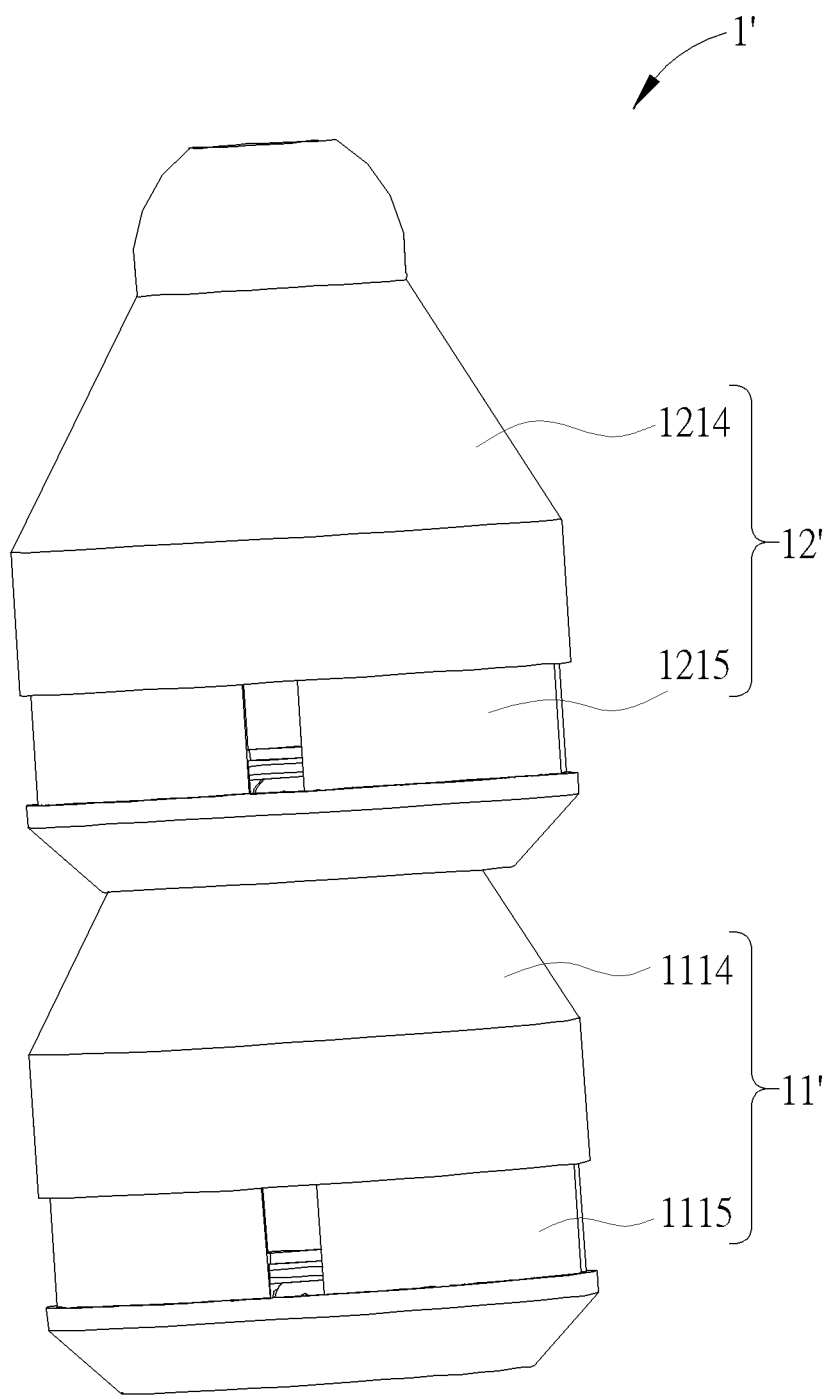
FIG. 10 is a diagram of the tubing structure in a second state according to the second embodiment of the present disclosure.

The operational principle of length adjustment of the tubing structure 1' is provided as follows. Refer to FIG. 10. FIG. 10 is a diagram of the tubing structure 1' in a second state according to the second embodiment of the present disclosure. For example, when it is desired to adjust the tubing structure 1' to the second state as shown in FIG. 10, the user can input commands for the controller 13 to control magnetism of the first upper magnetic component 1116A, the first lower magnetic component 1116B, the second upper magnetic component 1216A and the second lower magnetic component 1216B, so that a relation of the magnetism of the first upper magnetic component 1116A and the first lower magnetic component 1116B and a relation of magnetism of the second upper magnetic component 1216A and the second lower magnetic component 1216B can be shown in following Table 3. At this moment, the first upper magnetic component 1116A and the first lower magnetic component 1116B magnetically repulse each other. Therefore, the first upper portion 1114 can be driven to protrude relative to the first lower portion 1115 by magnetic repulsion of the first upper magnetic component 1116A and the first lower magnetic component 1116B for protruding a length of the first unit 11'. Furthermore, the second upper magnetic component 1216A and the second lower magnetic component 1216B magnetically repulse each other. Therefore, the second upper portion 1214 can be driven to protrude relative to the second lower portion 1215 by magnetic repulsion of the second upper magnetic component 1216A and the second lower magnetic component 1216B for protruding a length of the second unit 12'. Understandably, when it is desired to control the magnetism of the first upper magnetic component 1116A, the first lower magnetic component 1116B, the second upper magnetic component 1216A and the second lower magnetic component 1216B to make the first upper magnetic component 1116A and the second upper magnetic component 1216A magnetically attract the first lower magnetic component 1116B and the second lower magnetic component 1216B respectively, the first upper portion 1114 and the second upper portion 1214 can be driven to retract relative to the first lower portion 1115 and the second lower portion 1215 respectively by the aforementioned magnetic attraction. In such a way, the tubing structure 1' can utilize the aforementioned magnetic mechanism to achieve a purpose of adjusting the overall length of the tubing structure 1'.

| Upper magnetic component | Lower magnetic component | Magnetism relation |
| --- | --- | --- |
| First upper magnetic component 1116A | First lower magnetic component 1116B | Repulsion |
| Second upper magnetic component 1216A | Second lower magnetic component 1216B | Repulsion |

It should be noticed that, in this embodiment, each of the first upper magnetic component 1116A, the first lower magnetic component 1116B, the second upper magnetic component 1216A and the second lower magnetic component 1216B can preferably be an electromagnetic component electrically connected to the controller 13. However it is not limited thereto. Any component which can magnetically drive the first upper portion and the second upper portion to protrude or retract relative to the first lower portion and the second lower portion respectively is included within the scope of the present disclosure. For example, in another embodiment, each of the first upper magnetic component 1116A and the second upper magnetic component 1216A can be an electromagnetic component electrically connected to the controller 13, and each of the first lower magnetic component 1116B and the second lower magnetic component 1216B can be a permanent magnetic component or a magnetic conductive component. The controller 13 can control the magnetism of the first upper magnetic component 1116A and the second upper magnetic component 1216A to make the first upper magnetic component 1116A and the second upper magnetic component 1216A magnetically attract or repulse the first lower magnetic component 1116B and the second lower magnetic component 1216B respectively to drive the first upper portion 1114 and the second upper portion 1214 to move relative to the first lower portion 1115 and the second lower portion 1215 respectively for achieving the purpose of adjusting the overall length of the tubing structure 1'. Alternatively, in another embodiment, each of the first lower magnetic component 1116B and the second lower magnetic component 1216B can be an electromagnetic component electrically connected to the controller 13, and each of the first upper magnetic component 1116A and the second upper magnetic component 1216A can be a permanent magnetic component or a magnetic conductive component. The controller 13 can control the magnetism of the first lower magnetic component 1116B and the second lower magnetic component 1216B to make the first upper magnetic component 1116A and the second upper magnetic component 1216A magnetically attract or repulse the first lower magnetic component 1116B and the second lower magnetic component 1216B respectively to drive the first upper portion 1114 and the second upper portion 1214 to move relative to the first lower portion 1115 and the second lower portion 1215 respectively for achieving the purpose of adjusting the overall length of the tubing structure 1'. Besides, the magnetic mechanism capable of adjusting the bending angle of the tubing structure 1 according to the first embodiment also can be implemented to the tubing structure 1' according to the second embodiment, that is, the magnetic mechanism capable of adjusting the bending angle of the tubing structure and the magnetic mechanism capable of adjusting the overall length of the tubing structure can be combined together.

In contrast to the prior art, the present disclosure utilizes the controller to selectively control the first magnetic component and the second magnetic component to magnetically attract or repulse each other to drive the second body to move relative to the first body for inclining the second unit relative to the first unit. Therefore, even if there is no access for adjusting an inclined angle of the second unit relative to the first unit manually due to environmental limitations, the inclined angle of the second unit relative to the first unit still can be adjusted by the controller to achieve the purpose of adjusting a bending angle of the tubing structure, which brings convenience in use. Furthermore, the inclined angle of the second unit relative to the first unit can be firmly fixed by the magnetic mechanism between the first magnetic component and the second magnetic component and cannot be changed easily after a collision. Besides, the present disclosure further utilizes the controller to selectively control the first upper magnetic component and the first lower magnetic component to magnetically attract or repulse each other to drive the first upper portion to protrude or retract relative to the first lower portion and further control the second upper magnetic component and the second lower magnetic component to magnetically attract or repulse each other to drive the second upper portion to protrude or retract relative to the second lower portion to achieve the purpose of adjusting an overall length of the tubing structure. Therefore, the tubing structure of the present disclosure can accomplish a mission which a conventional robot arm cannot accomplish due to environmental limitations. Moreover, a distal end of the tubing structure can be equipped with cameras, light sources or forceps to execute a corresponding mission, such as being used as medical auxiliary illumination, a fixing device for a jig or a fixture, or an internal cavity detector. Besides, the first passage is at least partially communicated with the second passage when the first body and the second body engage with each other by the ball joint and the annular recess, which allows other components, such as electrical cables, or other devices, such as image capturing devices or fixing devices to pass through the tubing structure. Therefore, the tubing structure can be applied to different fields with different components or devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tubing structure comprising:
   a first unit comprising:
      a first body; and
      at least one first magnetic component disposed inside the first body;
   a second unit movably connected to the first unit, the second unit comprising:
      a second body movably engaging with the first body; and
      at least one second magnetic component disposed inside the second body and located at a position corresponding to the at least one first magnetic component; and
   a controller electrically connected to at least one of the at least one first magnetic component and the at least one second magnetic component, the controller selectively controlling the at least one first magnetic component and the at least one second magnetic component to magnetically attract or repulse each other to drive the second body to move relative to the first body for inclining the second unit relative to the first unit.

2. The tubing structure of claim 1, wherein the first body comprises a ball joint, an annular recess is formed on the second body, and the ball joint movably engages with the annular recess.

3. The tubing structure of claim 2, wherein a first passage is formed inside the first body, a second passage is formed inside the second body, and the first passage is at least partially communicated with the second passage when the first body and the second body engage with each other by the ball joint and the annular recess.

4. The tubing structure of claim 1, wherein the at least one first magnetic component and the at least one second magnetic component are electromagnetic components electrically connected to the controller, and the controller controls magnetism of the at least one first magnetic component and magnetism of the at least one second magnetic component.

5. The tubing structure of claim 1, wherein one of the at least one first magnetic component and the at least one second magnetic component is an electromagnetic component electrically connected to the controller, the controller controls magnetism of the electromagnetic component, and the other one of the at least one first magnetic component and the at least one second magnetic component is a permanent magnetic component or a magnetic conductive component.

6. The tubing structure of claim 1, wherein the first unit comprises a plurality of first magnetic components disposed inside the first body at intervals, the second unit comprises a plurality of second magnetic components disposed inside the second body at intervals and located at positions corresponding to the plurality of first magnetic components, the plurality of first magnetic components and the plurality of second magnetic components are electrically connected to the controller, and the controller selectively controls at least one of the plurality of first magnetic components and at least one of the plurality of second magnetic components to magnetically attract or repulse each other to drive the second body to move relative to the first body for inclining the second unit relative to the first unit.

7. The tubing structure of claim 6, wherein the plurality of first magnetic components are circularly disposed inside the first body at equal intervals, and the plurality of second magnetic components are circularly disposed inside the second body at equal intervals.

8. The tubing structure of claim 1, wherein the first body comprises:
   a first lower portion;
   a first upper portion protrusibly and retractably installed on the first lower portion; and
   a first protruding and retracting assembly configured to protrude or retract the first upper portion relative to the first lower portion.

9. The tubing structure of claim 8, wherein the first protruding and retracting assembly comprises:
   a first upper magnetic component disposed on the first upper portion; and
   a first lower magnetic component disposed on the first lower portion and located at a position corresponding to the first upper magnetic component;
   wherein the controller is connected to at least one of the first upper magnetic component and the first lower magnetic component, and the controller selectively controls the first upper magnetic component and the first lower magnetic component to magnetically attract or repulse each other to retract or protrude the first upper portion relative to the first lower portion.

10. The tubing structure of claim 9, wherein the first upper magnetic component and the first lower magnetic component are electromagnetic components electrically connected to the controller, and the controller controls magnetism of the first upper magnetic component and magnetism of the first lower magnetic component.

11. The tubing structure of claim 9, wherein one of the first upper magnetic component and the first lower magnetic component is an electromagnetic component electrically connected to the controller, the controller controls magnetism of the electromagnetic component, and the other one of the first upper magnetic component and the first lower magnetic component is a permanent magnetic component or a magnetic conductive component.

12. The tubing structure of claim 9, wherein the second body comprises:
   a second lower portion;
   a second upper portion protrusibly and retractably installed on the second lower portion; and
   a second protruding and retracting assembly configured to protrude or retract the second upper portion relative to the second lower portion.

13. The tubing structure of claim 12, wherein the second protruding and retracting assembly comprises:
   a second upper magnetic component disposed on the second upper portion; and
   a second lower magnetic component disposed on the second lower portion and located at a position corresponding to the second upper magnetic component;
   wherein the controller is connected to at least one of the second upper magnetic component and the second lower magnetic component, the controller selectively controls the second upper magnetic component and the second lower magnetic component to magnetically attract or repulse each other to retract or protrude the second upper portion relative to the second lower portion.

14. The tubing structure of claim 13, wherein the second upper magnetic component and the second lower magnetic component are electromagnetic components electrically connected to the controller, and the controller controls magnetism of the second upper magnetic component and magnetism of the second lower magnetic component.

15. The tubing structure of claim 13, wherein one of the second upper magnetic component and the second lower magnetic component is an electromagnetic component electrically connected to the controller, the controller controls magnetism of the electromagnetic component, and the other one of the second upper magnetic component and the second lower magnetic component is a permanent magnetic component or a magnetic conductive component.

16. A tubing structure comprising:
   a first unit comprising a first body, and the first body comprising:
      a first lower portion;
      a first upper portion protrusibly and retractably installed on the first lower portion; and
      a first protruding and retracting assembly configured to protrude or retract the first upper portion relative to the first lower portion, and the first protruding and retracting assembly comprising:
         a first upper magnetic component disposed on the first upper portion; and
         a first lower magnetic component disposed on the first lower portion and located at a position corresponding to the first upper magnetic component;
   a second unit movably connected to the first unit; and
   a controller electrically connected to at least one of the first upper magnetic component and the first lower magnetic component, the controller selectively controlling the first upper magnetic component and the first lower magnetic component to attract or repulse each other to protrude or retract the first upper portion relative to the first lower portion.

17. The tubing structure of claim 16, wherein the second unit comprises a second body, and the second body comprises:
   a second lower portion;
   a second upper portion protrusibly and retractably installed on the second lower portion; and
   a second protruding and retracting assembly configured to protrude or retract the second upper portion relative to the second lower portion, and the second protruding and retracting assembly comprises:
      a second upper magnetic component disposed on the second upper portion; and
      a second lower magnetic component disposed on the second lower portion and located at a position corresponding to the second upper magnetic component;
   wherein the controller is connected to at least one of the second upper magnetic component and the second lower magnetic component, and the controller selectively controls the second upper magnetic component and the second lower magnetic component to magnetically attract or repulse each other to retractor protrude the second upper portion relative to the second lower portion.

18. The tubing structure of claim 17, wherein the first unit further comprises at least one first magnetic component disposed on the first upper portion, the second unit further comprises at least one second magnetic component disposed on the second upper portion and located at a position corresponding to the at least one first magnetic component, the controller is electrically connected to at least one of the at least one first magnetic component and the at least one second magnetic component, and the controller selectively controls the at least one first magnetic component and the at least one second magnetic component to magnetically attract or repulse each other to drive the first body to move relative to the first body for inclining the second unit relative to the first unit.

19. The tubing structure of claim 18, wherein the first body further comprises a ball joint disposed on the first upper portion, an annular recess is formed on the second lower portion of the second body, the ball joint movably engages with the annular recess, a first passage is formed inside the first body, a second passage is formed inside the second body, and the first passage is at least partially communicated with the second passage when the first body and the second body movably engages with each other by the ball joint and the annular recess.

20. The tubing structure of claim 17, wherein the first unit further comprises a plurality of first magnetic components disposed on the first upper portion at intervals, the second unit further comprises a plurality of second magnetic components disposed on the second upper portion at intervals and located at positions corresponding to the plurality of first magnetic components, the plurality of first magnetic components and the plurality of second magnetic components are electrically connected to the controller, and the controller selectively controls at least one of the plurality of first magnetic components and at least one of the plurality of second magnetic components to magnetically attract or repulse each other to drive the second body to move relative to the first body for inclining the second unit relative to the first unit.

\* \* \* \* \*